Nov. 2, 1948.  J. H. PETERS  2,452,788
TELESCOPIC FISHING ROD
Filed April 17, 1947
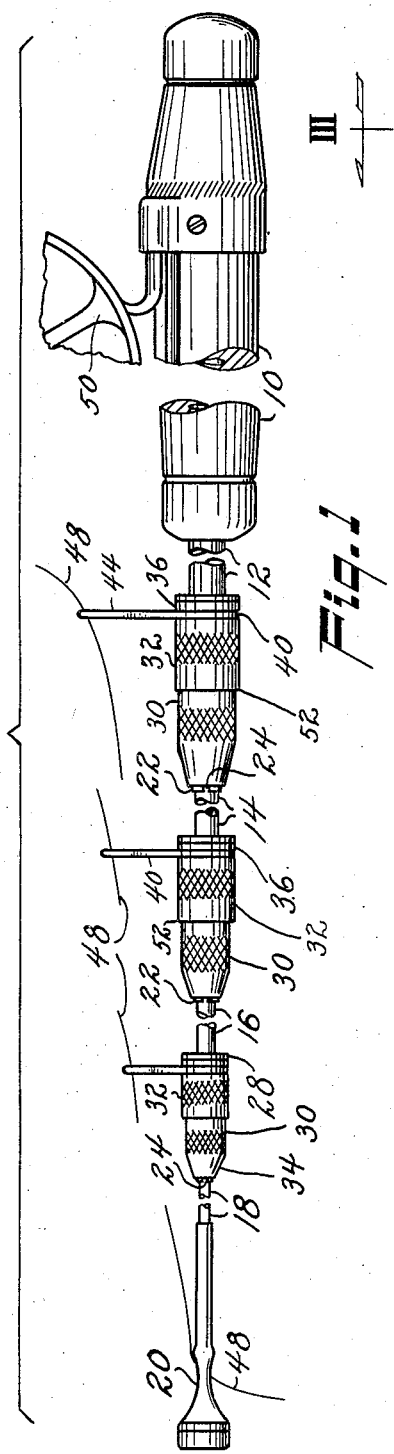
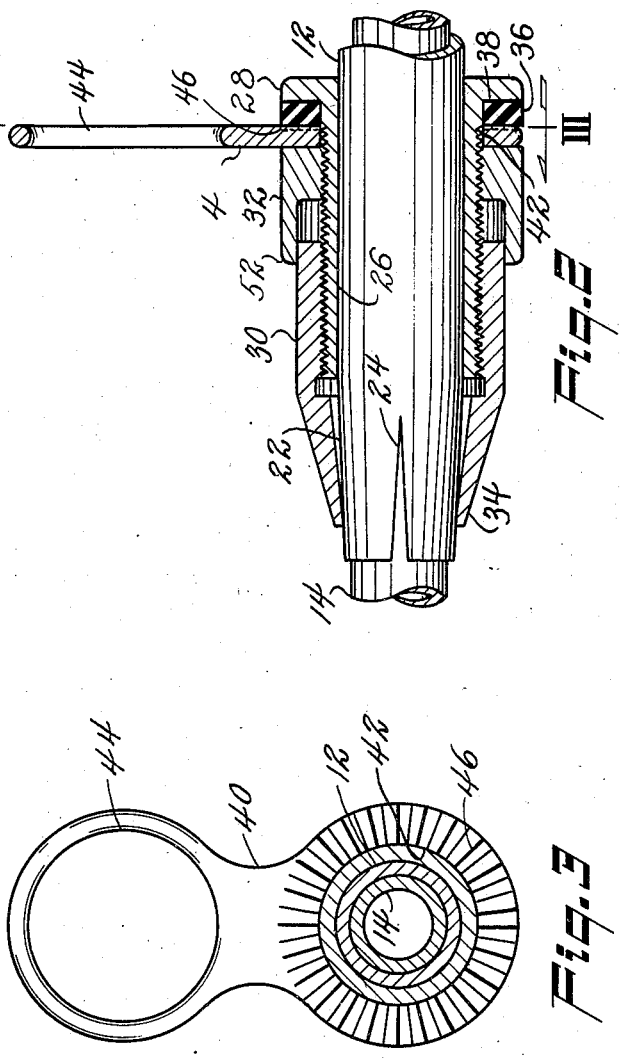
John H. Peters
INVENTOR.
BY Wm. O. Ballard
his attorney Patented Nov. 2, 1948

2,452,788

UNITED STATES PATENT OFFICE 2,452,788

TELESCOPIC FISHING ROD

John H. Peters, Toledo, Ohio

Application April 17, 1947, Serial No. 742,009

5 Claims. (Cl. 43—24)

This invention relates to fishing rods, more particularly to couplings for the multi-section telescopic tubular type wherein the couplings also provide the line guides.

An object of this invention is to provide a telescopic metal rod wherein the length of the rod may readily be adjusted for use in various types of fishing as still fishing, plug casting, fly fishing, etc., and the sections securely locked one as to the other.

Another object of this invention is to provide a coupling which can be used with cylindrical tube sections and when the sections are adjusted to and locked in their predetermined relationship, such couplings provide adjustable line guides which may be readily moved into and fixedly clamped in alignment throughout the rod or pole length.

Still another object of this invention is to provide a combination coupling and line guide for telescopic fishing rods which readily lends itself to be constructed from a minimum of parts and of such materials so as not to add any objectionable weight to the rod nor to interfere with its overall flexibility.

Still another object of this invention is to provide a combination coupling and line guide which may readily lock and unlock the telescopic sections, quickly adjust the line guide alignment and fix the same without the use of any tools.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a side elevation of a multi-section telescopic fishing rod, parts being broken away, such rod employing the combination coupling and line guide invention herein;

Fig. 2 is a longitudinal section on an enlarged scale, through one of the couplings of Fig. 1; and Fig. 3 is a view on the line III—III, Fig. 2.

For purposes of illustration, there is herein shown a fishing rod having handle 10 mounting first tubular steel section 12 which in turn mounts second section 14 in slip-fit telescopic relation therewith. A third section 16 may be carried by the section 14 in a like manner which section 16 in turn mounts rod 18 slidable therein and terminating in eye 20.

By this construction the rod may be adjusted to any length, within limits, and reversal of the handle 10 which has a seat in either end to receive the section 12 adapts the rod or pole to be used in various types of fishing.

When the rod is adjusted to the desired length and distribution of weight therealong, it is desirable to lock the several sections one as to the other and also set up a series of aligned line guides. To this end, a combined coupling and line guide embodying the invention herein is provided for each pair of sections.

The terminal portion of each section 12, 14, 16, remote from the handle is provided with a bevel 22 and one or more (preferably two) slits 24 forming tapered split termini. Adjacent the maximum diameter portion of the bevel 22 and extending away therefrom is threaded sleeve 26 terminating in collar 28. These sleeve elements are fixed on their respective rod sections as by sweating, welding or the like.

Mounted on the sleeve 26, in threaded engagement therewith, is a first nut 30 and a second nut 32, the first nut 30 having extension 34 which engages the bevel 22 and as this nut is rotated back and forth along the sleeve, such extension coacts with the split bevel to clamp or unclamp the two adjacent sections. This portion of the device is usually first employed to fix the fishing rod length.

The collar 28 is provided with a compressible washer or facing 36, secured to the side thereof toward the nuts by welding or by some suitable adhesive 38. Between the washer and nut 32 is arm 40 having aperture 42 through which the sleeve extends and eye 44 radially disposed outwardly from the rod. Once the pole length is fixed, the arm 40 may be rotated to any position radially of the rod and the nut 32 advanced toward the collar 28 until the arm is locked between the nut and washer at the predetermined position.

Roughened surface 46 about the aperture 42 (herein shown as corrugated but which may be knurling, grille or the like) aids in securely locking the arm in position. Once the guide eyes 44 are aligned line 48 may be threaded therethrough from reel 50 and through eye 20. Even with the line 48 in position, any one of the arms may readily be adjusted.

The parts of this device may be of a light weight material and the arm may be of plastic.

To protect the threading on the sleeve 26 from undue exposure, the nut 32 is provided with a skirt or shroud 52 which, when the parts are in assembled position, at least partially overlap the nut 30. The nuts 30, 32, may also have knurled exterior portions to facilitate manual rotation thereof thereby dispensing with the need for any tool in complete operation of the device.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and is desired to secure by United States Letters Patent:

1. A combination coupling and line guide for a pair of telescopic fishing rod sections having slip-fit connection one within the other, comprising a split tapered terminal portion on the outer section, threading on said outer section extending away from the terminal portion to a collar fixed on said section, a first nut on said threading having an extension for engaging the tapered terminal to clamp the same to the inner section as said nut is moved along the threading toward each collar, a second nut on said threading between the first nut and collar, and a line guide providing arm between said second nut and collar, said arm swingable around the sections to extend radially therefrom at a predetermined position and locked in such position by rotation of the second nut on the threading to clamp the same between the second nut and the said collar.

2. The structure set forth in claim 1 wherein a compressible member is disposed between said arm and collar.

3. The structure set forth in claim 2 wherein the face of the line guide carrying arm which engages the compressible member is of rough form.

4. A combination coupling and line guide for a pair of telescopic fishing rod sections having a slip-fit connection one within the other, comprising a split tapered terminal portion on the outer section, threading on said outer section extending away from the terminal portion to a collar fixed on said section, a first nut on said threading having an extension for engaging the tapered terminal to clamp or unclamp the same to the inner section as said nut is moved backward and forward along the threading by rotation thereof, a second nut on said threading between the first nut and collar, a line guide providing arm between said second nut and collar, said arm swingable around the sections to extend radially therefrom at a predetermined position and locked in such position by rotation of the second nut on the threading to clamp the same between the second nut and said collar, and a shroud extending from said second nut to at least partially overlap the portion of the first nut adjacent thereto when said parts are in assembled position.

5. A combination coupling and line guide for a pair of telescopic fishing rod sections having a slip-fit connection one within the other, comprising a split tapered terminal portion on the outer section, a threaded sleeve fixed on said outer section adjacent the tapered terminal and providing a collar remote therefrom, a first nut on said sleeve having an extension to coact with said tapered terminus to operate as a clamp for the inner section, a second nut on said sleeve between said first nut and said collar, a line guide providing arm mounted on said sleeve between said collar and second nut to be clamped in a predetermined position therebetween, and a shroud extending from said second nut to at least partially overlap the first nut.

JOHN H. PETERS.

REFERENCES CITED

The following references are of record in the file of this patent:

UNITED STATES PATENTS

| Number | Name | Date |
| --- | --- | --- |
| 1,473,437 | Lindstrom | Nov. 6, 1923 |
| 2,184,358 | Moore | Dec. 26, 1937 |
| 2,194,029 | Morehouse | Mar. 19, 1940 |